United States Patent
Bieber et al.

(10) Patent No.: US 6,814,158 B2
(45) Date of Patent: Nov. 9, 2004

(54) HAND-GUIDED DRILLING OR PERCUSSION DRILLING MACHINE

(75) Inventors: Karin Bieber, Zuchwill (CH); Thomas Iseli, Bellach (CH)

(73) Assignee: Scintilla AG, Solothurn (CH)

( * ) Notice: Subject to any disclaimer, the term of this patent is extended or adjusted under 35 U.S.C. 154(b) by 0 days.

(21) Appl. No.: 09/235,531

(22) Filed: Jan. 22, 1999

(65) Prior Publication Data

US 2001/0035292 A1 Nov. 1, 2001

(30) Foreign Application Priority Data

Jan. 30, 1998 (DE) ............................ 198 03 454

(51) Int. Cl.[7] ........................ B25D 16/00; B25D 17/00; B23B 45/16; F16D 43/204; F16D 43/00

(52) U.S. Cl. .................... 173/178; 173/176; 173/109; 173/48; 408/124; 408/139; 192/12 B; 192/20; 192/45; 188/82.84

(58) Field of Search ............... 192/45, 20, 12 B; 408/124, 139; 188/82.84; 173/48, 178, 176, 216, 109

(56) References Cited

U.S. PATENT DOCUMENTS

| | | | | |
|---|---|---|---|---|
| 1,915,542 | A | * | 6/1933 | Lundin et al. ............... 408/124 |
| 2,872,832 | A |   | 2/1959 | Appel et al. |
| 2,995,226 | A |   | 8/1961 | Gilder |
| 3,021,723 | A | * | 2/1962 | Happe ........................ 408/124 |
| 3,030,818 | A | * | 4/1962 | Zagar ......................... 408/124 |
| 3,110,381 | A |   | 11/1963 | Leu |
| 3,243,023 | A |   | 3/1966 | Boyden |
| 3,329,185 | A |   | 7/1967 | Hettich |
| 3,334,448 | A |   | 8/1967 | Alexander |
| 3,433,082 | A | * | 3/1969 | Bitter et al. ................. 408/124 |
| 3,436,994 | A | * | 4/1969 | Diener et al. ............ 188/82.84 |
| 3,517,574 | A | * | 6/1970 | Glatfelter ...................... 192/45 |
| 3,679,244 | A |   | 7/1972 | Reddy |
| 3,998,278 | A | * | 12/1976 | Stiltz et al. ................... 173/109 |
| 4,081,704 | A | * | 3/1978 | Vassos et al. .................. 310/50 |
| 4,277,074 | A |   | 7/1981 | Kilberis |
| 4,317,578 | A |   | 3/1982 | Welch |
| 4,400,995 | A |   | 8/1983 | Palm |
| 4,467,896 | A |   | 8/1984 | Sauerwein et al. |
| 4,489,525 | A |   | 12/1984 | Heck |
| 4,682,918 | A |   | 7/1987 | Palm |
| 4,706,791 | A | * | 11/1987 | Magliano ................. 192/223.2 |
| 4,754,669 | A |   | 7/1988 | Verdier et al. |
| 4,878,405 | A |   | 11/1989 | Wolfe |
| 5,016,501 | A |   | 5/1991 | Holzer, Jr. |
| 5,016,591 | A |   | 5/1991 | Nanyoshi et al. |
| 5,496,139 | A |   | 3/1996 | Ghode et al. |
| 5,624,013 | A |   | 4/1997 | Tsai |
| 5,788,021 | A | * | 8/1998 | Tsai ......................... 188/82.84 |
| 5,947,254 | A |   | 9/1999 | Jones |
| 5,984,022 | A | * | 11/1999 | Harman, Jr. et al. ........ 173/176 |
| 6,010,426 | A |   | 1/2000 | Nakamura |
| 6,035,947 | A |   | 3/2000 | Chung |

FOREIGN PATENT DOCUMENTS

| | | |
|---|---|---|
| DE | 43 05 965 C2 | 8/1997 |
| DE | 297 15 257 U1 | 1/1998 |
| DE | 198 03 454 A1 | 8/1999 |
| EP | 0 612 588 A1 | 8/1994 |
| EP | 0 909 614 A1 | 4/1999 |
| GB | 2 327 054 | 1/1999 |
| WO | 99/10132 | 3/1999 |

* cited by examiner

Primary Examiner—Erica Cadugan
(74) Attorney, Agent, or Firm—Michael J. Striker

(57) ABSTRACT

In a hand-guided percussion drilling machine an arresting coupling non-rotatably coupling a drilling spindle relative to a machine housing is arranged on an intermediate shaft rotatably connected with the drilling spindle and extending parallel to and at a radial distance from the drilling spindle and at a radial distance from the motor shaft, wherein the arresting coupling openings during a torque transmission from a drive motor to a tool holder in one direction and closes during a torque transmission from the tool holder in an opposite direction.

21 Claims, 2 Drawing Sheets

HAND-GUIDED DRILLING OR PERCUSSION DRILLING MACHINE

BACKGROUND OF THE INVENTION

The present invention relates to a hand-guided drilling machine or percussion drilling machine.

German patent document DE-A 43 05 965 discloses a drilling machine which is provided with an arresting device for non-rotatably arresting a drilling spindle relative to a housing of the hand power tool, so that a drill chuck which is screwed with the drilling spindle is released from the drilling spindle and/or a tool can be clamped in the drilling chuck without a key. The known drilling machine has the disadvantage that the spindle arresting is released manually by a push button pressure. This poses the difficulty for the user to hold with one hand the tool or the tool chuck and with the other hand the drilling machine, in addition to the release the spindle arresting. Moreover, the presence of a safety device is required, to prevent that the spindle arresting is released during rotation of the drilling spindle.

U.S. Pat. No. 5,016,501 discloses an accu-bar screwdriver, in which an arresting coupling is provided between an output shaft of a planetary transmission and a hexagonal screwing tool receptacle. It is designed so that the bar screwdriver can be used as a manual hand screwdriver. The hexagonal receptacle is neither removable from the output shaft, nor a torque can be maintained during a tool exchange.

SUMMARY OF THE INVENTION

Accordingly, it is an object of the present invention to provide a hand-guided drilling or percussion drilling machine, which avoids the disadvantages of the prior art.

In keeping with these objects and with others which will become apparent hereinafter, one feature of present invention resides, briefly stated, in a hand-guided drilling or percussion drilling machine in which the arresting coupling is arrested between the drilling spindle or an intermediate shaft connected with the drilling spindle and a machine housing or a component connected with it, and the arresting coupling during a torque transmission from the drive motor to the tool is opened automatically arid during the torque transmission toward the tool holder in an opposite direction is blocked automatically.

When the machine is designed in accordance with the present invention, it has the advantage that the tool in the tool receptacle can be clamped without problems without key or the tool chuck can be released without problems from the drilling spindle, since the drilling spindle is automatically arrested. A separate operator for the operation for arresting of the drilling spindle is not needed. In addition, the safety devices for preventing the rotary arresting with a rotatable drilling spindle are superfluous. The inventive drilling or percussion drilling machine therefore has a simpler construction and simpler operation.

It is especially advantageous when in accordance with the present invention, the arresting coupling is arranged on an intermediate shaft, since then the axial percussion movement of the drilling spindle does not provide a disturbing influence on the arresting of the drilling spindle.

It is also advantageous when in accordance with still a further embodiment of the present invention the intermediate shaft and the drilling spindle are coupled through a transmission connection with a negative transmission ratio, since then, in particular during screwing or unscrewing of the tool holder, opposite torque peaks are reduced.

The coupling claws of the arresting coupling on a toothed gear in accordance with another feature of the present invention provides for an especially simple construction of the arresting coupling. The toothed gear and the driver disc can be arranged on the same shaft so as to reduce components tolerances and to guarantee an especially reliable arresting.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
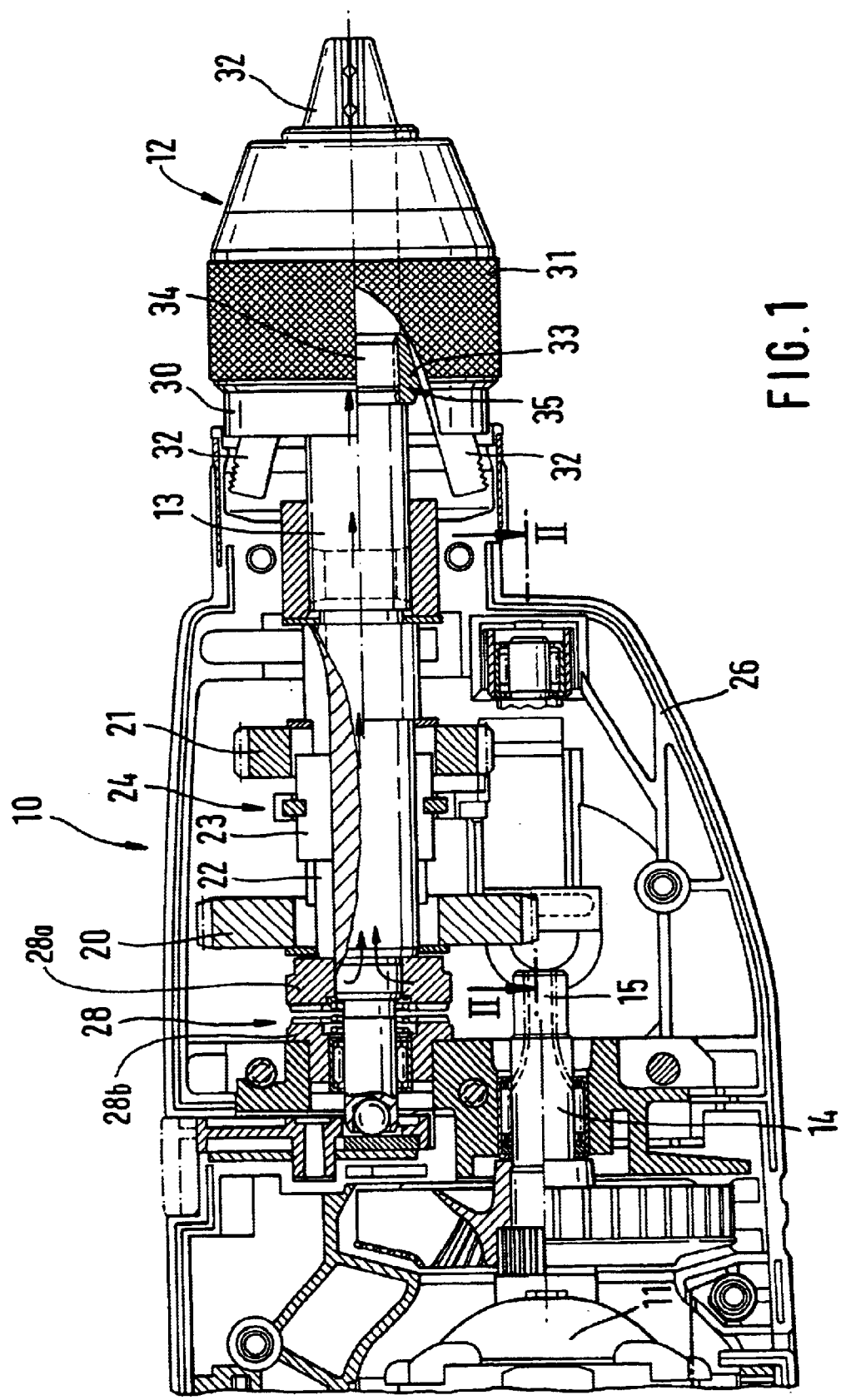
FIG. 1 is a view showing a longitudinal section of a front part of a percussion drilling machine in accordance with the present invention.

FIG. 1 shows a percussion drilling machine which is identified with reference numeral 10. It has a drive motor 11 for a rotatable drive of a tool holder 12. The drive motor 11 is accommodated in a machine housing 26. It is in a transmission connection with a drilling spindle 13, with which the tool holder 12 is screwed through a thread 35.

Figure 2:
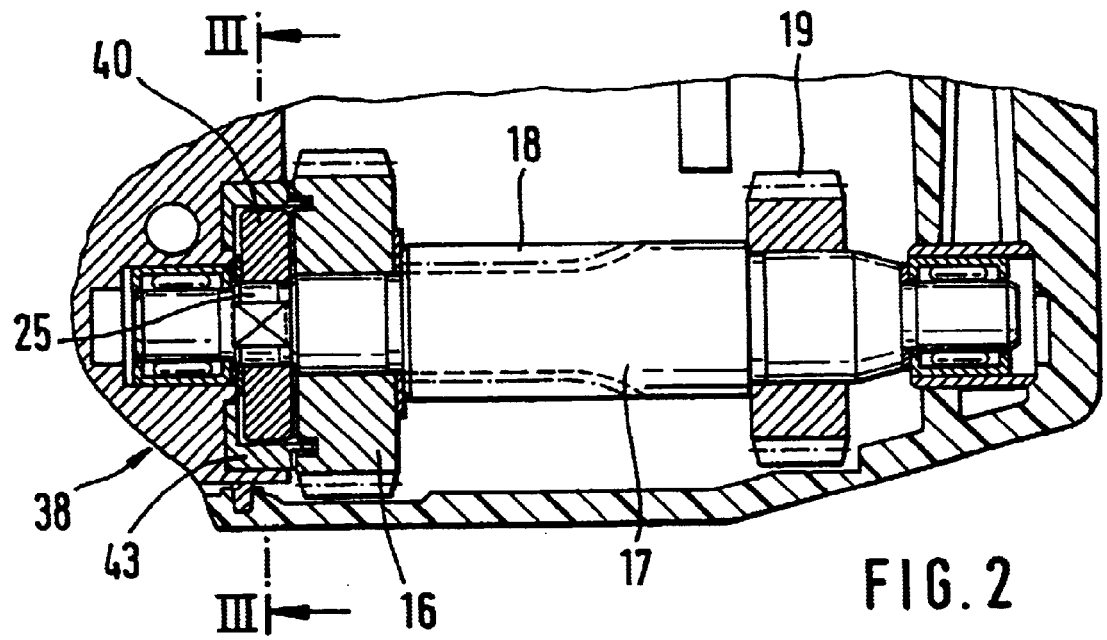
FIG. 2 is a view showing a section taken along the line II—II in FIG. 1 of the inventive machine.

The drive motor 11 has a motor shaft which at one end is connected with a drive pinion 15. The drive pinion 15 engages with a toothed gear 16 shown in FIG. 2 and rotatably supported on an intermediate shaft 17. The intermediate shaft 17 has teeth 18, 19 which engage in a transmission gears 20, 21. The transmission gears are rotatably supported on the drilling spindle 13. The transmission gears 20, 21 are non-rotatably connected with the drilling spindle 13 by an axially displaceable driving key 23 located in a longitudinal groove 22 of the drilling spindle 13. The driving key 23 together with the transmission gears 20, 21 and a not shown actuating device, form a switching transmission 24 with two stages. A first stage (slow rotary speed) is formed by the gear pair 18, 20, while a second stage (fast rotary speed) is formed by the gear pair 19, 21. The transmission ratio of the transmission stages 18, 20 and 19, 21 is negative. In other words, a transmission from the intermediate shaft 17 to the drilling spindle 13 results in a slowing action.

At the end of the drilling spindle 13 facing away from the tool holder 12, an arresting impact mechanism 28 is located. The arresting impact mechanism 28 has first and second parts 28a and 28b and is used for delivering axial impacts against the drilling spindle 13. The arresting impact mechanism 28 is turned off in a conventional manner, so that the percussion drilling machine 10 can be also used as a drilling machine with two stages.

The tool holder 12 is formed as a jaw chuck. It has chuck jaws 32 which are adjustable by a sleeve and a conical nut 30 non-rotatably connected with it. The shaft of a tool is clampable between the chuck jaws 32. A base body 33 of the tool holder 12 is screwed through a thread 35 on a threaded pin 34 of the drilling spindle 13 with high pre-tensioning. Therefore, the tool holder 12 and the drilling spindle 13 are fixed non-rotatably with one another during the use of the percussion drilling machine 10.

Figure 3:
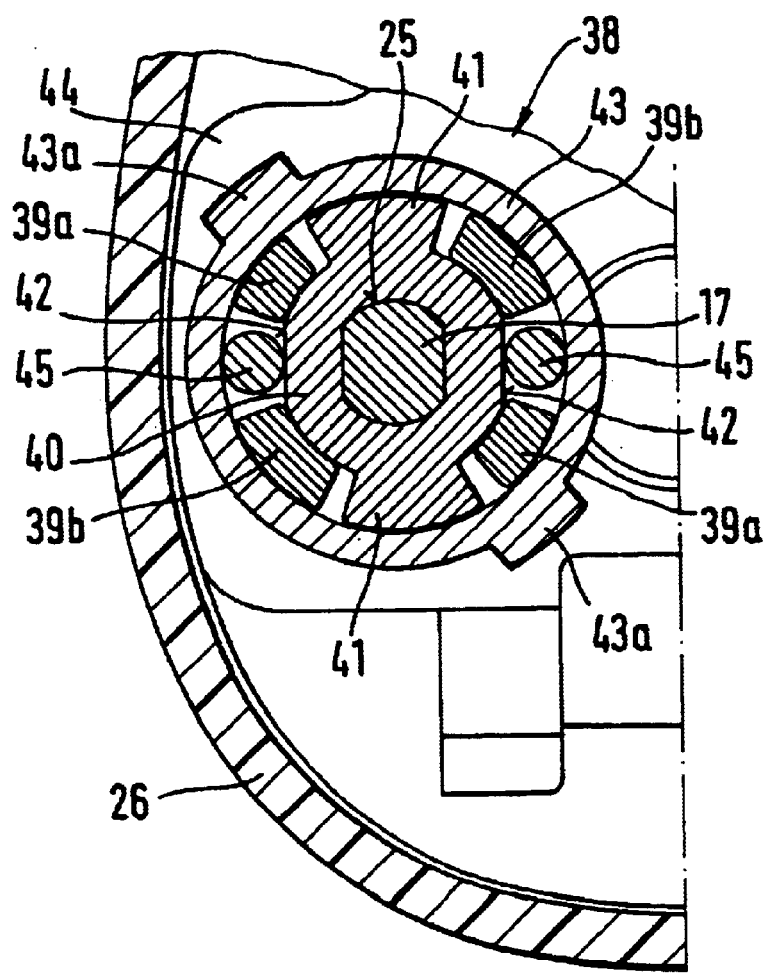
FIG. 3 is a view showing a section taken along the line III—III in FIG. 2 of the inventive machine.

The toothed gear 16 is rotatably coupled with the intermediate shaft 17 through an arresting coupling 38 which is shown in section in FIG. 3. The arresting coupling 38 has four claws 39a, b located at an end side of the toothed gear 16 and extending parallel to one another. A disc 40 is inserted between the claws 39a, b and has two radially extending driver elements 41. The driver elements 41 are formed so that the disc is rotated to a limited extent between the neighboring claws 39a, b.

The disc 40 has a substantially cylindrical basic form on its periphery at the connection to the driver elements 41, turning substantially centrally between the neighboring driver elements 41 into a flattening 42. The disc 40 is surrounded by an arresting ring 43 which is non-rotatably fixed in a housing projection 44 of the machine housing 26 by radially extending projections 43a. The arresting ring 43 has a different radial distance to the disc 40. In the region of the driver element 41 a small movement gap is provided between the disc 40 and the arresting ring 43. A radial distance between the disc 40 and the arresting ring 43 is provided in the cylindrical region of the disc 40 following the drive element 41. It is sufficient to receive the claws 39a, b, with a small movement gap. In the region of the flattening 42, a radial distance between the arresting ring 43 and the disc 40 increases. In this region a cylindrical roller body 45 with a small movement gap is received, with a diameter exceeding the radial thickness of the claws 39a, b.

The claws 39a, b are differently long in the peripheral direction. The diagonal opposite pairs 39a, or 39b have however the same length. The disc 40 is arranged on a bearing seat 25 of the intermediate shaft 17 with a geometrical form-locking connection. This means that a torque can be transmitted to the intermediate shaft 17 through the claws 39a, b and the driver elements 41.

In this case, the claws 39a, b act in a torque transmitting manner on the driver elements 41. The roller bodies 45 therefore come to a position before the corresponding neighboring claw 39a because of their inertia behavior. The neighboring claws 39b, hold then the roller bodies 45 in the region of the flattening 42 so that an unhindered torque transmission is guaranteed.

When the torque transmission is performed in an opposite direction from the tool holder 12, the driver elements 4 act in a torque-transmitting manner on the claws 39a, b. Due to their inertia, the roller bodies 45 are urged in direction toward the torque-transmitting claws 39a, b, and they are clamped between the arresting ring 42 and the disc 40. The disc 40 is therefore automatically arrested to be fixed with the housing. Due to the arresting, it is then possible, to apply an opposite torque on the drilling spindle 13 without manually loosening an arresting coupling, during clamping or releasing a tool in the tool holder 12 or during screwing or unscrewing the tool holder 12 from the drilling spindle.

It will be understood that each of the elements described above, or two or more together, may also find a useful application in other types of constructions differing from the types described above.

While the invention has been illustrated and described as embodied in hand-guided drilling or percussion drilling machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A hand-guided percussion drilling machine, comprising a machine housing; a drilling spindle having an axis; a drive motor for rotatably driving said drilling spindle, said drive motor having a motor shaft; an impact mechanism for strikingly driving said drilling spindle; a tool holder formed as a drilling chuck and screwed with said drilling spindle through a thread, said drilling spindle during exchanging a tool or exchanging said tool holder receiving a releasing or tightening moment; an arresting coupling non-rotatably coupling said drilling spindle relative to said machine housing; an intermediate shaft rotatably connected with said drilling spindle and extending parallel to and at a radial distance from said drilling spindle and at a radial distance from said motor shaft; a component connected with said machine housing; said arresting coupling being arranged between said intermediate shaft, which is located at the radial distance from said drilling spindle and at the radial distance from said motor shaft, and an element selected from the group consisting of said machine housing and said component connected with said machine housing, said arresting coupling opening during a torque transmission from said drive motor to the tool in one direction and closing during a torque transmission from said tool holder in an opposite direction and wherein said arresting coupling is positioned such that it is not subject to strikes of said impact mechanism, said arresting coupling being arranged on said intermediate shaft.

2. A hand-guide drilling machine as defined in claim 1, wherein said arresting coupling is formed as a claw coupling including a plurality of claws and a toothed gear so that said claws arranged at an end side of said toothed gear and extend parallel to one another in an axial direction for torque transmission.

3. A hand-guide drilling machine as defined in claim 2, wherein said claws have different lengths in a circumferential direction, said claws including pairs of said claws which are located diametrically opposite to one another and have identical lengths.

4. A hand-guide drilling machine as defined in claim 1, wherein said arresting coupling is arranged on said intermediate shaft; and further comprising at least one transmission stage coupling said intermediate shaft with said drilling spindle.

5. A hand-guide drilling machine as defined in claim 4, wherein said at least one transmission stage has a negative transmission ratio from said intermediate shaft to said drilling spindle.

6. A hand-guide drilling machine as defined in claim 1, wherein said arresting coupling has a disc with a plurality of driver elements radially projecting from said disc for torque transmission, said intermediate shaft having a bearing seat on which said disc is non-rotatebly arranged.

7. A hand-guide drilling machine as defined in claim 6, wherein said disc and said toothed gear are supported on said intermediate shaft.

8. A hand-guide drilling machine as defined in claim 6, wherein said intermediate shaft in the region of said bearing seat has a cross-section which deviates from a cylindrical shape for forming a geometrical form-locking connection with said disc.

9. A hand-guide drilling machine as defined in claim 1; and further comprising a toothed gear which is arranged on said intermediate shaft, said tooth and gear being rotatable relative to said intermediate shaft and being couplable for a rotation of said intermediate shaft through said arresting coupling.

10. A hand-guide drilling machine as defined in claim 1, wherein said arresting coupling has a ring which is non-rotatably fixed by radially extending projections in said machine housing.

11. A hand-guided drilling machine or percussion drilling machine, comprising a machine housing; a drilling spindle having an axis; a drive motor for rotatably driving said drilling spindle, said drive motor having a motor shaft; an impact mechanism for strikingly driving said drilling spindle; a tool holder formed as a drilling chuck and connected with said drilling spindle, said drilling spindle during exchanging a tool or exchanging said tool holder receiving a releasing or tightening moment; an arresting coupling non-rotatably coupling said drilling spindle relative to said machine housing; an intermediate shaft rotatably connected with said drilling spindle and extending parallel to and at a radial distance from said drilling spindle and at a radial distance from said motor shaft; a component connected with said machine housing; said arresting device being arranged between said intermediate shaft, which is located at the radial distance from said drilling spindle and at the radial distance from said motor shaft, and an element selected from the group consisting of said machine housing and said component connected with said machine housing, said arresting coupling opening during a torque transmission from said drive motor to the tool in one direction and closing during a torque transmission from said tool holder in an opposite direction and wherein said arresting coupling is positioned such that it is not subject to strikes of said impact mechanism, said arresting coupling being arranged on said intermediate shaft.

12. A hand-guide drilling machine as defined in claim 11, wherein said arresting coupling is formed as a claw coupling including a plurality of claws and a toothed gear so that said claws arranged at an end side of said toothed gear and extend parallel to one another in an axial direction.

13. A hand-guide drilling machine as defined in claim 11 and further comprising at least one transmission stage coupling said intermediate shaft with said drilling spindle.

14. A hand-guide drilling machine as defined in claim 13, wherein said at least one transmission stage has a negative transmission ratio from said intermediate shaft to said drilling spindle.

15. A hand-guide drilling machine as defined in claim 11, wherein said arresting coupling has a disc with a plurality of driver elements radially projecting from said disc for torque transmission, said intermediate shaft having a bearing seat on which said disc is non-rotatably arranged.

16. A hand-guide drilling machine as defined in claim 15, wherein said intermediate shaft in the region of bearing seat has a cross-section which deviates from a cylindrical shape for forming a geometrical form-locking connection with said disc.

17. A hand-guide drilling machine as defined in claim 15, wherein said disc and said toothed gear are supported on said intermediate shaft.

18. A hand-guided percussion drilling machine, comprising a machine housing; a drilling spindle having an axis and performing an axial percussion movement and a rotary drilling movement; a drive motor for rotatably driving said drilling spindle, said drive motor having a motor shaft; an impact mechanism for strikingly driving said drilling spindle; a tool holder formed as a drilling chuck and directly connected with said drilling spindle, said drilling spindle during exchanging a tool or exchanging said tool holder receiving a releasing or tightening moment; an arresting coupling non-rotatably coupling said drilling spindle relative to said machine housing; an intermediate shaft rotatably connected with said drilling spindle and extending parallel to and at a radial distance from said drilling spindle and at a radial distance from said motor shaft, said arresting coupling opening during a torque transmission from said drive motor to the tool in one direction and closing during a torque transmission from said tool holder in an opposite direction to allow clamping and releasing the tool in the tool holder or connecting the tool holder to and removing the tool holder from said drilling spindle, said arresting coupling also being arranged so that it is not subjected to strikes of said impact mechanism, said arresting coupling being arranged on said intermediate shaft.

19. A hand-guided drilling machine or percussion drilling machine, comprising a machine housing; a drilling spindle having an axis; a drive motor for rotatably driving said drilling spindle, said drive motor having a motor shaft; a tool holder formed as a drilling chuck and screwed with said drilling spindle through a thread, said drilling spindle during exchanging a tool or exchanging said tool holder receiving a releasing or tightening moment; an arresting coupling non-rotatably coupling said drilling spindle relative to said machine housing; an intermediate shaft rotatably connected with said drilling spindle and extending parallel to and at a radial distance from said drilling spindle and at a radial distance from said motor shaft; a component connected with said machine housing; said arresting coupling being arranged between said intermediate shaft, which is located at the radial distance from said drilling spindle and at the radial distance from said motor shaft, and an element selected from the group consisting of said machine housing and said component connected with said machine housing, said arresting coupling opening during a torque transmission from said drive motor to the tool in one direction and closing during a torque transmission from said tool holder in an opposite direction, said arresting coupling being arranged on said intermediate shaft.

20. A hand-guided drilling machine or percussion drilling machine, comprising a machine housing; a drilling spindle having an axis; a driver motor for rotatably driving said drilling spindle and having a motor shaft; a tool holder formed as a drilling chuck and connected with said drilling spindle, said drilling spindle during exchanging a tool or exchanging said tool holder receiving a releasing or tightening moment; an arresting coupling non-rotatably coupling said drilling spindle relative to said machine housing; an intermediate shaft rotatably connected with said drilling spindle and extending parallel to and at a radial distance from said drilling spindle and at a radial distance from said motor shaft; a component connected with said machine housing; said arresting coupling being arranged between said intermediate shaft, which is located at the radial distance from said drilling spindle and at the radial distance from said motor shaft, and an element selected from the group consisting of said machine housing and said component connected with said machine housing, said arresting coupling opening during a torque transmission from said drive motor to the tool in one direction and closing during a torque transmission from said toot holder in an opposite direction, said arresting coupling being arranged on said intermediate shaft.

21. A hand-guided percussion drilling machine, comprising a machine housing: a drilling spindle having an axis and performing an axial percussion movement and a rotary drilling movement; a drive motor for rotatably driving said drilling spindle, said drive motor having a motor shaft; an impact mechanism for strikingly driving said drilling spindle; a tool holder formed as a drilling chuck and directly connected with said drilling spindle, said drilling spindle during exchanging a tool or exchanging said tool holder receiving a releasing or tightening moment; an arresting coupling non-rotatably coupling said drilling spindle relative to said machine housing; an intermediate shaft rotatably connected with said drilling spindle end extending parallel to and at a radial distance from said drilling spindle and at a radial distance from said motor shaft; said arresting coupling being arranged between said intermediate shaft, which is located at the radial distance from said drilling spindle and at the radial distance from said motor shaft, and an element selected from the group consisting of said machine housing and a component connected with said machine housing, said arresting coupling opening during a torque transmission from said drive motor to the tool in one direction and closing during a torque transmission from said tool holder in an opposite direction to allow clamping and releasing the tool in the tool holder or connecting the tool holder to and moving the tool holder from said drilling spindle, and wherein said arresting device is positioned such that it is not subject to strikes of said impact mechanism, said arresting coupling being arranged on said intermediate shaft.

* * * * *